United States Patent
Sigmund

(10) Patent No.: US 8,495,597 B2
(45) Date of Patent: *Jul. 23, 2013

(54) ON THE FLY GENERATION OF MULTIMEDIA CODE FOR IMAGE PROCESSING

(75) Inventor: Ulrich Sigmund, Karlsruhe (DE)

(73) Assignee: STMicroelectronics, Inc., Carrollton, TX (US)

( * ) Notice: Subject to any disclaimer, the term of this patent is extended or adjusted under 35 U.S.C. 154(b) by 1027 days.

This patent is subject to a terminal disclaimer.

(21) Appl. No.: 11/552,124

(22) Filed: Oct. 23, 2006

(65) Prior Publication Data

US 2007/0074183 A1     Mar. 29, 2007

Related U.S. Application Data

(63) Continuation of application No. 09/614,635, filed on Jul. 12, 2000, now Pat. No. 7,168,069.

(51) Int. Cl.
*G06F 9/45*         (2006.01)

(52) U.S. Cl.
USPC .......................... 717/140; 717/136; 717/144

(58) Field of Classification Search
USPC ......................................... 717/106, 136–161
See application file for complete search history.

(56) References Cited

U.S. PATENT DOCUMENTS

| | | | |
|---|---|---|---|
| 4,667,290 A * | 5/1987 | Goss et al. | 717/147 |
| 4,951,194 A | 8/1990 | Bradley et al. | |
| 5,307,492 A * | 4/1994 | Benson | 717/159 |
| 5,590,331 A | 12/1996 | Lewis et al. | |
| 5,598,560 A * | 1/1997 | Benson | 717/159 |
| 5,696,974 A | 12/1997 | Agrawal et al. | |
| 5,703,887 A | 12/1997 | Heegard et al. | |
| 5,708,473 A | 1/1998 | Mead | |
| 5,758,075 A | 5/1998 | Graziano et al. | |
| 5,778,180 A | 7/1998 | Gentry et al. | |
| 5,819,088 A | 10/1998 | Reinders | |
| 5,835,773 A | 11/1998 | Dunn | |
| 5,850,258 A | 12/1998 | Kang | |

(Continued)

FOREIGN PATENT DOCUMENTS

| | | |
|---|---|---|
| EP | 0903944 | 3/1994 |
| EP | 0712249 | 5/1996 |

(Continued)

OTHER PUBLICATIONS

Rainer Leupers; Code selection for media processors with SIMD instructions; ACM New York, NY, USA; 2000, pp. 4-8.*

(Continued)

*Primary Examiner* — Wei Zhen
*Assistant Examiner* — Satish Rampuria
(74) *Attorney, Agent, or Firm* — Michael A. Glenn; Glenn Patent Group

(57) ABSTRACT

A method and apparatus for processing multimedia instruction enhanced data by the use of an abstract routine generator and a translator. The abstract routine generator takes the multimedia instruction enhanced data and generates abstract routines to compile the multimedia instruction enhanced data. The output of the abstract generator is an abstract representation of the multimedia instruction enhanced data. The translator then takes the abstract representation and produces code for processing.

19 Claims, 1 Drawing Sheet

U.S. PATENT DOCUMENTS

| | | | | |
|---|---|---|---|---|
| 5,854,927 A | * | 12/1998 | Gelissen | 717/139 |
| 5,875,442 A | | 2/1999 | Jordan, II et al. | |
| 5,938,734 A | | 8/1999 | Yao et al. | |
| 5,966,534 A | | 10/1999 | Cooke et al. | |
| 6,049,668 A | | 4/2000 | Smith et al. | |
| 6,058,143 A | | 5/2000 | Golin | |
| 6,061,770 A | | 5/2000 | Franklin | |
| 6,081,846 A | | 6/2000 | Hyder et al. | |
| 6,081,883 A | | 6/2000 | Popelka et al. | |
| 6,091,897 A | * | 7/2000 | Yates et al. | 717/138 |
| 6,096,095 A | * | 8/2000 | Halstead | 717/107 |
| 6,170,075 B1 | | 1/2001 | Schuster et al. | |
| 6,226,769 B1 | | 5/2001 | Schuster et al. | |
| 6,247,071 B1 | | 6/2001 | Cardoso, Jr. | |
| 6,269,484 B1 | | 7/2001 | Simsic et al. | |
| 6,282,243 B1 | | 8/2001 | Kazui et al. | |
| 6,285,713 B1 | | 9/2001 | Nakaya et al. | |
| 6,295,376 B1 | | 9/2001 | Nakaya et al. | |
| 6,357,039 B1 | | 3/2002 | Kuper | |
| 6,473,897 B1 | * | 10/2002 | Ansari et al. | 717/136 |
| 6,490,673 B1 | | 12/2002 | Heishi et al. | |
| 6,493,467 B1 | * | 12/2002 | Okuda et al. | 382/260 |
| 6,502,115 B2 | * | 12/2002 | Abdallah et al. | 708/204 |
| 6,578,197 B1 | * | 6/2003 | Peercy et al. | 717/143 |

FOREIGN PATENT DOCUMENTS

| | | |
|---|---|---|
| EP | 0735467 | 10/1996 |
| EP | 0735769 | 10/1996 |
| EP | 0914009 | 10/1998 |
| EP | 0948214 | 3/1999 |
| EP | 0710027 | 5/2001 |
| JP | 02000112849 | 4/2000 |
| WO | WO95/35628 | 12/1995 |
| WO | WO98/43167 | 10/1997 |
| WO | WO99/10811 | 3/1999 |

OTHER PUBLICATIONS

Aho, et al.; "Compilers: Principles, Techniques and Tools"; 1986; Addison Wesley Longman, pp. 1-24.

*Dictionary of Computing*; 1996; Fourth Edition; Oxford University Press, p. 149.

"Exploiting SIMD Parellelism in DSP and Multimedia Algorithims Usings the AltiVec Technology"; Huy Nguyen, Lizy Kurian John; 1999, The University of Texas at Austin; pp. 11-18.

Computer Graphics: Principles and Practice; 1987 Cornell University; Foley et al; pp. 1, 2, 991, and 992.

"Pipeline Vectorization for Reconfigurable Systems"; Field-Programmable Custom Computing Machines 1999. FCCM '99. Proceedings; 7th Annual IEEE Symposium on Napa Valley, CA Apr. 1999'; pp. 52-62.

"Macro-based Hardware Compilation of Java<TM> bytecodes Into a Dynamic Reconfigurable Computing System"; Filed-Programmable Custom Computing Machines 1999. Proceedings; Napa Valley Apr. 1999; pp. 2-10.

"The Long and Winding Road to High-Performance Image Processing with MMX/SSE"; Computer Architectures for Mahcine Perception, 2000. Proceedings. Fifth IEEE International Workshop on Padova, Italy; Sep. 2000; pp. 302-310.

Woo Hyong Lee, J. Morris Chang, and Yusuf Hasan; Evaluation of a High-Performance Object Reuse Dynamic Memory Allocation Policy for C++ Programs; Illinois Institute of Technology, Chicago, IL; 2000; pp. 386-390.

R.J. Clark, and M.H. Ammar; Providing Scalable Web Service Using Multicast Delivery; Coll. of Comput., Georgia Inst. of Technology, Atlanta, GA; 1995; pp. 1-2.

Eddy De Greef, Francky Catthoor, Hugo De Man; Memory Size Reduction Through Storage Order Optimization for Embedded Parallel Multimedia Applications; Catholic University, Lewen, Belgium; Oct. 1996'; pp. 1811-1837.

* cited by examiner

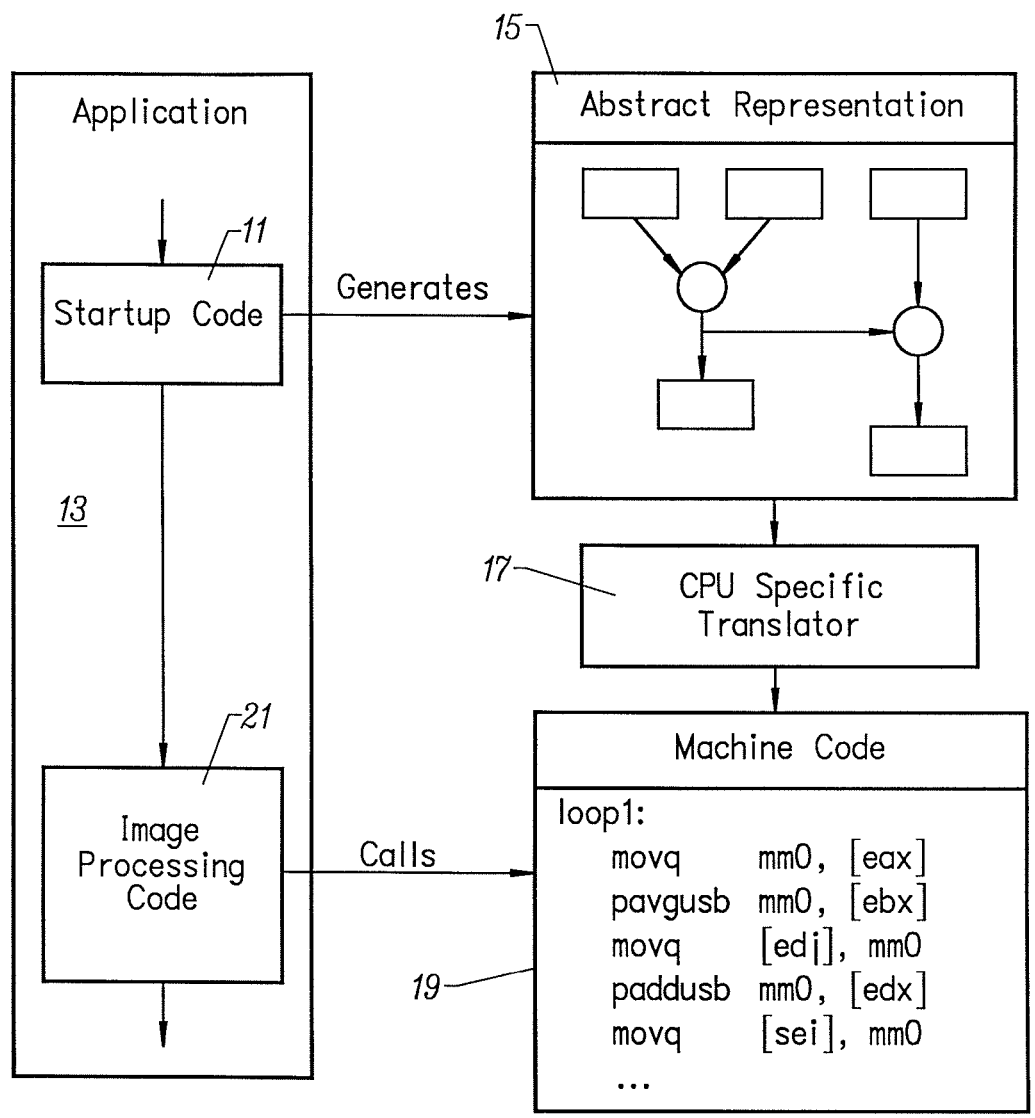

ON THE FLY GENERATION OF MULTIMEDIA CODE FOR IMAGE PROCESSING

CROSS REFERENCE TO RELATED APPLICATION

This application is a continuation of U.S. patent application Ser. No. 09/614,635, filed Jul. 12, 2000, now U.S. Pat. No. 7,168,069.

BACKGROUND OF THE INVENTION

1. Field of the Invention

The invention relates to the processing of multimedia data with processors that feature multimedia instruction enhanced instruction sets. More particularly, the invention relates to a method and apparatus for generating processor instruction sequences for image processing routines that use multimedia is enhanced instructions.

CROSS REFERENCE TO COMPUTER PROGRAM LISTING APPENDIX

The enclosed Computer Program Listing Appendix contains the following file in one CD-R (of which two identical copies are included herewith), and is part of the present disclosure and is incorporated by reference herein in its entirety:
    11552124_source.txt File size: 32.9 KB.

2. Description of the Prior Art

In general, most programs that use image processing routines with multimedia instructions do not use a general-purpose compiler for these parts of the program. These programs typically use assembly routines to process such data. A resulting problem is that the assembly routines must be added to the code manually. This step requires high technical skill, is time demanding, and is prone to introduce errors into the code.

In addition, different type of processors, (for example, Intel's Pentium I w/MMX and Pentium II, Pentium III, Willamette, AMD's K-6 and AMD's K-7 aka. Athlon) each use different multimedia command sets. Examples of different multimedia command sets are MMX, SSE and 3DNow. Applications that use these multimedia command sets must have separate assembly routines that are specifically written for each processor type.

At runtime, the applications select the proper assembly routines based on the processor detected. To reduce the workload and increase the robustness of the code, these assembly routines are sometimes generated by a routine specific source code generator during program development.

One problem with this type of programming is that the applications must have redundant assembly routines which can process the same multimedia data, but which are written for the different types of processors. However, only one assembly routine is actually used at runtime. Because there are many generations of processors in existence, the size of applications that use multimedia instructions must grow to be compatible with all of these processors. In addition, as new processors are developed, all new routines must be coded for to these applications so that they are compatible with the new processors. An application that is released prior to the release of a processor is incompatible with the processor unless it is first patched/rebuilt with the new assembly routines.

It would be desirable to provide programs that use multimedia instructions which are smaller in size. It would be desirable to provide an approach that adapts such programs to future processors more easily.

SUMMARY OF THE INVENTION

In accordance with the invention, a method and apparatus for generating assembly routines for multimedia instruction enhanced data is shown and described.

An example of multimedia data that can be processed by multimedia instructions are the pixel blocks used in image processing. Most image processing routines operate on rectangular blocks of evenly sized data pieces (e.g. 16×16 pixel blocks of 8 bit video during MPEG motion compensation). The image processing code is described as a set of source blocks, destination blocks and data manipulations. Each block has a start address, a pitch (distance in bytes between two consecutive lines) and a data format. The full processing code includes width and height as additional parameters. All of these parameters can either be integer constants or arguments to the generated routine. All data operations are described on SIMD data types. A SIMD data type is a basic data type (e.g. signed byte, signed word, or unsigned byte) and a number or repeats (e.g. 16 pixels for MPEG Macroblocks). The size of a block (source or destination) is always the size of its SIMD data type times its width in horizontal direction and the height in vertical direction.

In the presently preferred embodiment of the invention, an abstract image generator inside the application program produces an abstract routine representation of the code that operates on the multimedia data using SIMD operations. A directed acyclic graph is a typical example of a generic version. A translator then generates processor specific assembly code from the abstract representation.

BRIEF DESCRIPTION OF THE DRAWINGS

FIG. 1 is a block diagram of a computer system that may be used to implement a method and apparatus embodying the invention for translating a multimedia routine from its abstract representation generated by an abstract routine generator inside the application's startup code into executable code using the code generator.

DESCRIPTION OF THE PREFERRED EMBODIMENT

In FIG. 1 the startup code 11 of the application program 13, further referred to as the abstract routine generator, generates an abstract representation 15 of the multimedia routine represented by a data flow graph. This graph is then translated by the code generator 17 into a machine specific sequence of instructions 19, typically including several SIMD multimedia instructions. The types of operations that can be present inside the data flow graph include add, sub, multiply, average, maximum, minimum, compare, and, or, xor, pack, unpack and merge operations. This list is not exhaustive as there are operations currently performed by MMX, SSE and 3DNow for example, which are not listed. If a specific command set does not support one of these operations, the CPU specific part of the code generator replaces it by a sequence of simpler instructions (e.g. the maximum instruction can be replaced by a pair of subtract and add instruction using saturation arithmetic).

The abstract routine generator generates an abstract representation of the code, commonly in the form of a directed acyclic graph during runtime. This allows the creation of multiple similar routines using a loop inside the image processing code 21 for linear arrays, or to generate routines on the fly depending on user interaction. E.g. the bi-directional MPEG 2 motion compensation can be implemented using a set of sixty-four different but very similar routines, that can be generated by a loop in the abstract image generator. Or an interactive paint program can generate filters or pens in the form of abstract representations based on user input, and can use the routine generator to create efficient code sequences to perform the filtering or drawing operation. Examples of the data types processed by the code sequences include: SIMD input data, image input data and audio input data.

Examples of information provided by the graphs include the source blocks, the target blocks, the change in the block, color, stride, change in stride, display block, and spatial filtering.

The accuracy of the operation inside the graphs can be tailored to meet the requirements of the program. The abstract routine generator can increase its precision by increasing the level of arithmetics per pixel. For example, 7-bit processing can be stepped up to 8-bit, or 8-bit to 16-bit. E.g. motion compensation routines with different types of rounding precision can be generated by the abstract routine generator.

The abstract representation, in this case the graph 15, is then sent to the translator 17 where it is translated into optimized assembly code 19. The translator uses standard compiler techniques to translate the generic graph structure into a specific sequence of assembly instructions. As the description is very generic, there is no link to a specific processor architecture, and because it is very simple it can be processed without requiring complex compiler techniques. This enables the translation to be executed during program startup to without causing a significant delay. Also, the abstract generator and the translator do not have to be programmed in assembly. The CPU specific translator may reside in a dynamic link library and can therefore be replaced if the system processor is changed. This enables programs to use the multimedia instructions of a new processor, without the need to be changed.

Tables A-C, included in Appendix A provide sample code that generates an abstract representation for a motion compensation code that can be translated to an executable code sequence using the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. An apparatus for generating processor-specific assembly code dynamically, comprising:
a computer; and
a program, executable on said computer, comprising:
an abstract routine generator within said executable program, said abstract routine generator for dynamically receiving multimedia instruction enhanced data, for generating a multimedia routine within said executable program to compile the multimedia instruction enhanced data and for dynamically outputting a non-processor-specific graphical representation of the multimedia instruction enhanced data at program run-time; and
a translator within said executable program, said translator for dynamically receiving said non-processor-specific graphical representation and for dynamically outputting processor-specific assembly code translated from said non-processor-specific, graphical representation for processing multimedia input data at program run-time.

2. The apparatus of claim 1, wherein said multimedia input data comprise SIMD input data.

3. The apparatus of claim 1, wherein said multimedia input data comprise image input data.

4. The apparatus of claim 1, wherein said multimedia input data comprise audio input data.

5. The apparatus of claim 1, wherein said non-processor-specific graphical representation is input to said translator.

6. The apparatus of claim 1, wherein the output of said translator is in assembly code.

7. The apparatus of claim 1, wherein said translator's configuration is changeable by use of a dynamic library link.

8. The apparatus of claim 1, wherein said processor-specific code performs any of the operations of add, sub, multiply, average, maximum, minimum, compare, and, or, xor, pack, unpack, and merge on said multimedia input data.

9. The apparatus of claim 1, wherein said non-processor-specific graphical representation is a function of any of source block, target block, change in the block, color, stride, change in stride, display block, and spatial filtering.

10. A method for generating processor-specific assembly code dynamically, comprising:
via a computer, an abstract routine generator within an executable program dynamically receiving multimedia instruction enhanced data for generating a multimedia routine within the executable program to compile the multimedia instruction enhanced data; and
via a computer, dynamically generating a non-processor-specific graphical representation of the multimedia instruction enhanced data by said abstract routine generator at program run-time; and
via a computer, dynamically receiving said non-processor-specific graphical representation from said abstract routine generator by a translator within the executable program; and
via a computer, dynamically outputting processor-specific assembly code translated from said non-processor-specific graphical representation for processing multimedia input data at program run-time by said translator.

11. The method of claim 10, wherein said multimedia input data comprise SIMD data.

12. The method of claim 10, said multimedia input data comprise image data.

13. The method of claim 10, wherein said multimedia input data comprise audio data.

14. The method of claim 10, wherein said non-processor-specific graphical representation is input to said translator.

15. The method of claim 10, wherein the output of said translator is assembly code.

16. The method of claim 10, wherein said processor-specific code performs any of the operations of add, sub, multiply, average, maximum, minimum, compare, and, or, xor, pack, unpack, and merge on said multimedia input data.

17. The method of claim 10, wherein said non-processor-specific graphical representation is a function of any of source block, target block, change in the block, color, stride, change in stride, display block, and spatial filtering.

18. The method of claim 10, wherein said translator is changeable by use of a dynamic library link.

19. An apparatus comprising:
a computer memory; and
computer-readable instructions embodied within said memory for establishing an apparatus for generating processor-specific assembly code dynamically comprising:
an abstract routine generator within said executable program, said abstract routine generator for dynamically receiving multimedia instruction enhanced data, for generating a multimedia routine within said executable program to compile the multimedia instruction enhanced data and for dynamically outputting a non-processor-specific graphical representation of the multimedia instruction enhanced data at program run-time; and a translator within said executable application program for dynamically receiving said non-processor-specific graphical representation and for dynamically outputting processor-specific assembly code translated from said non-processor-specific graphical representation for processing multimedia input data at program run-time.

* * * * *